United States Patent [19]

Hendry

[11] Patent Number: 5,728,410
[45] Date of Patent: Mar. 17, 1998

[54] SYSTEM FOR INJECTION MOLDING OF PLASTIC ARTICLE UTILIZING A VARIABLE VOLUME SPILL CAVITY

[75] Inventor: James W. Hendry, Brooksville, Fla.

[73] Assignee: Melea Limited, Gibraltar Heights, Gibraltar

[21] Appl. No.: 736,017

[22] Filed: Oct. 22, 1996

Related U.S. Application Data

[62] Division of Ser. No. 492,589, Jun. 21, 1995, Pat. No. 5,607,640.

[51] Int. Cl.⁶ .................................................. B29C 45/00
[52] U.S. Cl. ........................... 425/130; 425/533; 425/546
[58] Field of Search ............................... 425/130, 533, 425/546, 812

[56] References Cited

U.S. PATENT DOCUMENTS

| | | | |
|---|---|---|---|
| 2,331,688 | 10/1943 | Hobson | 264/536 |
| 3,044,118 | 7/1962 | Bernhardt et al. | 264/85 |
| 3,135,640 | 6/1964 | Kepka et al. | 264/45.2 |
| 4,101,617 | 7/1978 | Friederich | 425/533 |
| 4,136,220 | 1/1979 | Olabisi | 264/572 |
| 4,414,167 | 11/1983 | Prusak et al. | 264/40.5 |
| 5,069,859 | 12/1991 | Loren | 425/812 |
| 5,443,087 | 8/1995 | Myles | 137/596.15 |

FOREIGN PATENT DOCUMENTS

| | | |
|---|---|---|
| 0393315 | 10/1990 | European Pat. Off. |
| 0402730 | 12/1990 | European Pat. Off. |
| 0438279 | 7/1991 | European Pat. Off. |
| 0628395 | 12/1994 | European Pat. Off. |
| 0678370 | 10/1995 | European Pat. Off. |
| 0692360 | 1/1996 | European Pat. Off. |
| 1145441 | 10/1957 | France. |
| 4002503 | 5/1991 | Germany. |
| 4033298 | 5/1991 | Germany. |
| 4014963 | 12/1991 | Germany. |
| 4240017 | 6/1994 | Germany. |
| 4334012 | 10/1994 | Germany. |
| 5-096560 | 4/1993 | Japan. |
| 5-154862 | 6/1993 | Japan. |
| 6-064024 | 3/1994 | Japan. |
| 6-238697 | 8/1994 | Japan. |
| 6-297522 | 10/1994 | Japan. |
| 95-20477 | 3/1995 | WIPO. |

OTHER PUBLICATIONS

German Magazine *Magazin Spritzgiessen von Kunstoffen*, "Herstellung von Hohlkörpern durch Kunststoffen", 279 Kunststoffberater 28 (1983) Sep. No. 9, Iserhagen, Germany. (Sep. 1983).

Patent Abstracts of Japan, vol. 18, No. 452 (M–1661), of Japan Reference 6–143,318 dated May 24, 1994.

Patent Abstracts of Japan of Japan Reference 7–148,768 dated Jun. 13, 1995.

*Primary Examiner*—Robert Davis
*Attorney, Agent, or Firm*—Brooks & Kushman P.C.

[57] ABSTRACT

A method and system for injection molding plastic articles which utilize a spill cavity whose volume varies. In one embodiment, the volume varies during introduction of pressurized gas into a mold cavity flow coupled to the spill cavity. In another embodiment, the volume of the spill cavity varies during a plastic injection which fills the mold cavity. A piston reciprocally mounted within a cylinder defines the variable volume of the spill cavity. In one embodiment, a pneumatic control circuit controls the pressure on a lower surface of the piston to thereby control the position of the piston within the cylinder and therefore the volume of the spill cavity. In another embodiment, an air spring is utilized to control pressure on the piston which counters the pressure of the plastic on the piston. In one embodiment, a stop pin connected to the piston prevents the piston from leaving the cylinder when the mold is opened and solidified plastic in the spill cavity is to be ejected therefrom. An ejector pin ejects plastic after it is pulled out of the spill cavity. Various ways of introducing a controlled amount of gas pressure at the lower surface of the piston are provided including through the stop pin.

10 Claims, 7 Drawing Sheets

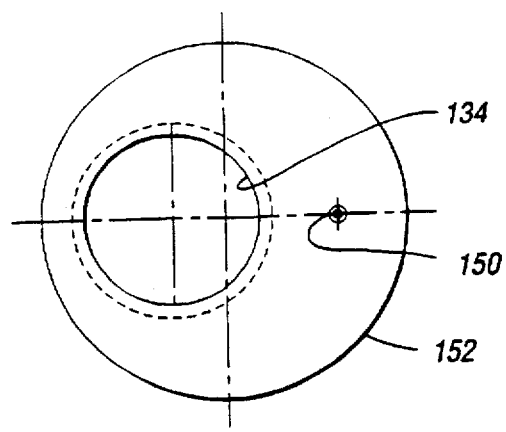
Fig. 14
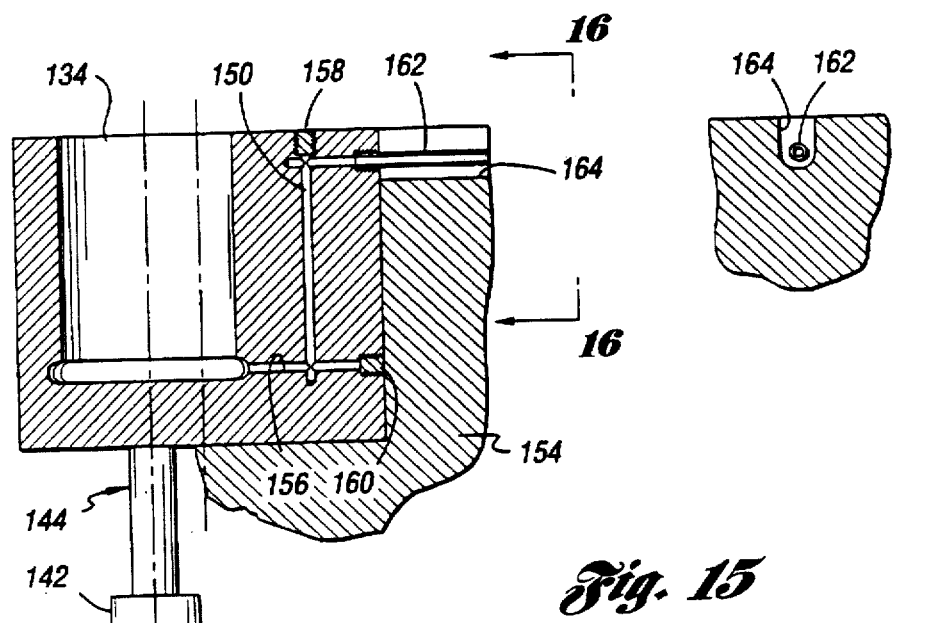
Fig. 16
Fig. 15
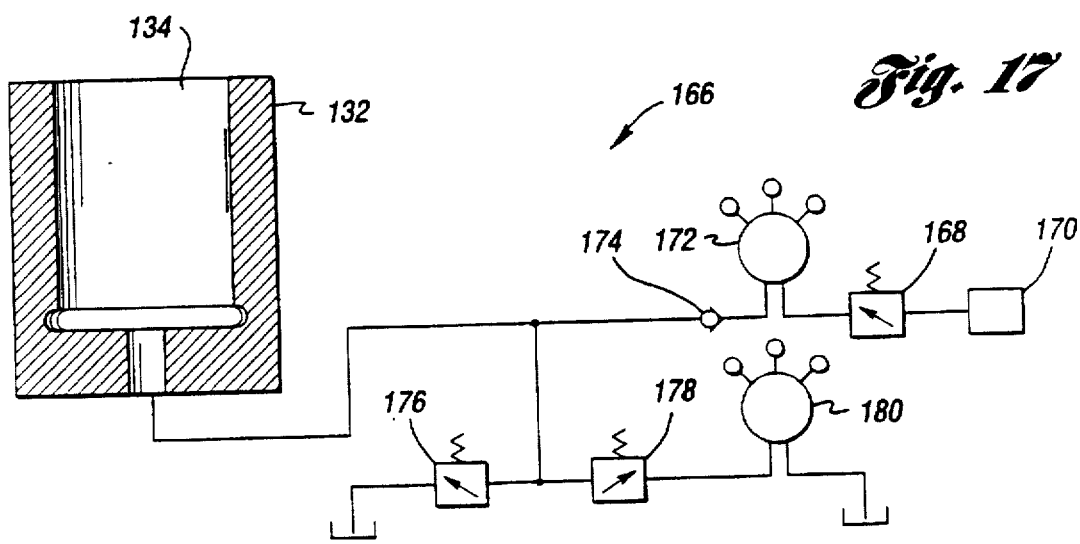
Fig. 17 ness of the gas channels; (3) eliminates inaccuracies in the screw ram to deliver the same quantity of plastic shot after shot; and (4) allows positive displacement of plastic into a spill cavity to insure no blow out as in FIG. 2 or solid as in FIG. 3, and a strain-free molding (i.e., no overpacking).
SYSTEM FOR INJECTION MOLDING OF PLASTIC ARTICLE UTILIZING A VARIABLE VOLUME SPILL CAVITY This is a divisional of application Ser. No. 08/492,589 filed on Jun. 21, 1995 now U.S. Pat. No. 5,607,640.

CROSS-REFERENCE TO RELATED APPLICATION

This application is related to U.S. Pat. No. 5,443,087, entitled "Method and System for Controlling a Pressurized Fluid and Valve Assembly for Use Therein", which has the same Assignee as the Assignee of the present invention and which is hereby incorporated by reference.

TECHNICAL FIELD

This invention relates to plastic injection molding and, more particularly, to plastic injection molding which includes a spill cavity.

BACKGROUND ART

In the plastic injection molding art, the usual challenges facing a product designer is to design an article having requisite strength for the product application and uniform surface quality for satisfactory appearance, but to avoid excessive weight, material usage and cycle time. A design compromise must often be made between strength and plastic thickness. A relatively thicker plastic section in the article, such as a structural rib, will incur greater weight, material usage, cycle time and induce sink marks and other surface defects due to thermal gradients in the area of the thickened section.

It is known in the plastic molding art to use pressurized fluid in conjunction with the plastic molding of articles as shown in U.S. Pat. No. 5,098,637 to Hendry. The pressurized fluid is typically nitrogen gas which is introduced into the mold cavity at or near the completion of the plastic injection. The pressurized fluid serves several purposes. First, it allows the article so formed to have hollow interior portions which correspond to weight and material savings. Second, the pressurized fluid within the mold cavity applies outward pressure to force the plastic against the mold surfaces while the article solidifies. Third, the cycle time is reduced as the gas migrates through the most fluent inner volume of the plastic and replaces the plastic in these areas which would otherwise require an extended cooling cycle. Fourth, the gas pressure pushes the plastic against the mold surfaces, thereby obtaining the maximum coolant effect from the mold.

However, as the dimensions of the molded article increase, the gas must do more work to migrate through the volume of the mold cavity to assist in setting up the article within the cavity. If the pressure of the gas is too great as it enters the mold cavity, there is a risk that it may rupture or blow out the plastic within the mold cavity, i.e., the gas is not contained within the plastic. Thus, there have been practical limitations in the adaptation of gas injection in the plastic molding field.

The above-noted U.S. patent to Hendry solves most of these problems.

As illustrated in FIGS. 1-4, another approach is to use a fixed volume spill cavity 24 with a block pin 20 and shims 26 to control the volume of plastic going into the spill cavity 24.

In FIG. 1, the pin 20 is in its up position blocking plastic flow from the molding in the article-defining cavity 12, through a runner 23 and into the spill cavity 24. In FIGS. 2-4, the pin 20 is in its down position allowing plastic to go to the spill cavity 24 by the pressure of the gas.

However, injection molding machines do not deliver the same quantity of plastic shot after shot. When doing straight compact injection molding, the cushion of plastic in front of the screw after the mold is full and the high pressure packing starts, takes care of this inaccuracy of the screw ram to deliver the same quantity of plastic on each shot (i.e., the cushion can fall from 10 mm to 5 mm with no difficulty in molding the compact injection molding).

However, with some parts, one does not want to pack the molding. One wants to just fill the cavity. If one packs the molding, a strain pattern will already be in place within the molding and the hollowing out of the part will not relieve the strain already in place in the molding.

FIG. 2 illustrates blow out in the spill cavity 24 causing a loss of gas pressure in the molding in the article defining cavity 21. One result of this is a possible shrinkage due to loss of gas pressure in the molding in the article defining cavity 21. Also, gas leakage may occur at the mold parting line.

FIG. 3 illustrates the use of too much plastic which would result in sink marks at reference numeral 26.

Finally, FIG. 4 illustrates the addition of the shims 26. However, overpacking and blow out as illustrated in FIGS. 3 and 2, respectively, can still occur.

SUMMARY OF THE INVENTION

An object of the present invention is to provide a method and system for injection molding utilizing a variable volume spill cavity which: (1) eliminates the need for a shut off pin in a fixed volume shut off situation; (2) eliminates blow out in a spill over area that causes loss of gas pressure in the gas channel and resulting collapsing of the walls of the gas channels; (3) eliminates inaccuracies in the screw ram to deliver the same quantity of plastic shot after shot; and (4) allows positive displacement of plastic into a spill cavity to insure no blow out as in FIG. 2 or solid as in FIG. 3, and a strain-free molding (i.e., no overpacking).

In carrying out the above object and other objects of the present invention, a method is provided for injection molding a hollow plastic article. The method includes the steps of injecting a quantity of fluid plastic into a mold cavity having a shape defining at least a portion of the article; displacing a portion of the plastic from the mold cavity into a spill cavity having a volume flow coupled to the mold cavity by introduction of a charge of pressurized gas into the mold cavity; permitting the injected plastic to solidify; venting the gas from the mold cavity; and removing the plastic article from the mold. The improvement of the method includes the step of allowing the volume of the spill cavity to increase during the step of displacing to produce a substantially strain-free hollow plastic article.

Preferably, the volume of the cavity is defined by an upper surface of a piston reciprocally mounted in a cylinder.

In one embodiment, the method further includes the step of increasing pressure on a lower surface of the piston and to move the piston to an up position and wherein the step of allowing includes the step of reducing the pressure on the lower surface of the piston to allow the piston to move to a down position.

Further in carrying out the above objects and other objects of the present invention, a system is provided for carrying out the above-noted method steps.

Still further in carrying out the above objects and other objects of the present invention, another method for injection molding a plastic article is provided. The method includes the steps of injecting a quantity of fluid plastic into a mold cavity having a shape defining at least a portion of the article; allowing a portion of the plastic from the mold cavity in flow into a spill cavity having a volume flow coupled to the mold cavity; permitting the injected plastic to solidify; and removing the plastic article from the mold. The improvement of the method includes the step of allowing the volume of the spill cavity to increase during the step of injecting to produce a substantially strain-free plastic article.

In the one embodiment, the method and system of the present invention utilize pneumatic pressure so that when the pressure of the plastic being injected by a screw ram overcomes the pneumatic pressure on the lower surface of the pneumatic piston, the piston will move downward making sure that the molding will not see more pressure than the fill pressure. Therefore, the hollow plastic part will be substantially strain-free. In this way, the inaccuracy of the screw ram to deliver the same quantity of plastic shot after shot is compensated for.

FIGS. 5–7 broadly illustrate the method and system of the present invention wherein the pin and shims 26 of FIG. 4 have been eliminated and replaced with a variable volume spill cavity, the volume of which is controlled by a piston 30, the lower surface 32 of which is exposed to a gas pressure from a control circuit (not shown therein).

FIG. 5 illustrates the gas piston 30 in its up position with the mold closed during injection of the plastic into an article defining cavity 21 and into a runner 23.

FIG. 6 illustrates the location of the plastic after it has been injected into the article defining cavity 21 wherein inaccuracies in shot weight delivered by the screw ram are taken up by an upper portion of the spill cavity 24, identified by reference letter Z. If the injection pressure of the plastic to fill the mold is, for example, 1000 psi then Z will take up the 1000 psi and not allow the screw ram to go into a packing phase at a pressure much higher than 1000 psi. If such a pressure over 1000 psi was reached, this would strain the molding in the article defining cavity 21.

When gas is injected into the molding in the article defining cavity 21 to create a void 34, excess plastic is discharged into the spill cavity 24 and is taken up the amount which is indicated by reference letter W in FIG. 7.

The present invention admits to molding of relatively large size structural articles for use in diverse product fields, such as a bumper having a pair of end wings for an automobile.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 14 is a top plan view of a cylinder having an offset hole for supplying pressurized gas;

FIG. 15 is a side elevational view, partially broken away and in cross-section, illustrating a gas passageway and gas pipe for allowing gas to enter and exit the cylinder;

FIG. 16 is an end view taken along lines 16—16 of FIG. 15 and illustrating the gas pipe in a cut in the mold;

FIG. 17 is a schematic diagram of a gas control circuit for controlling the flow of gas to and from the cylinder;

BEST MODE FOR CARRYING OUT THE INVENTION

Figure 8:
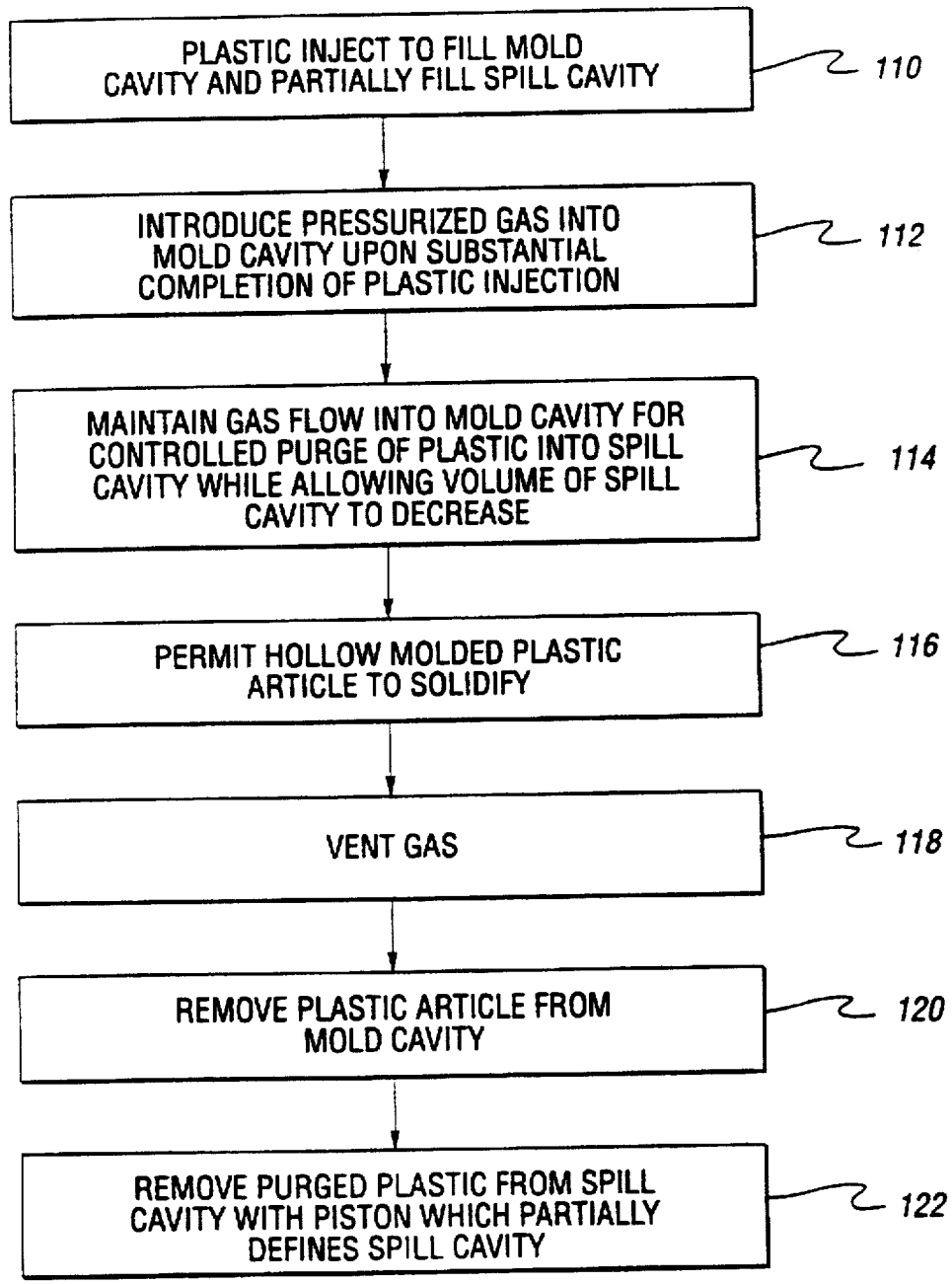
FIG. 8 is a flow chart indicating the basic steps involved in the practice of the method of the present invention.

FIG. 8 is a flow chart of the steps involved in practicing the process of the present invention.

Figure 1:
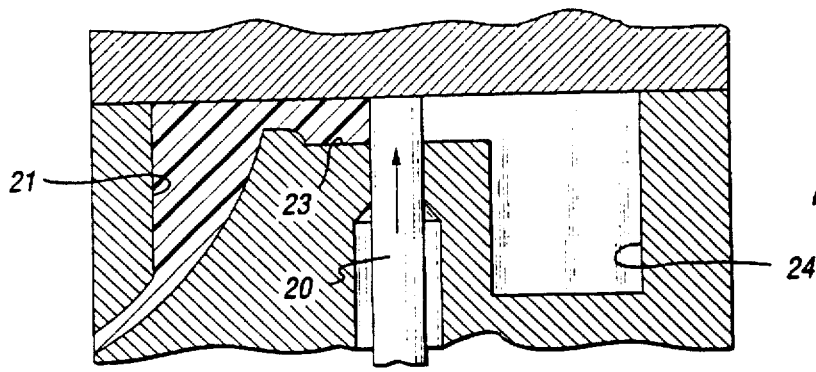
FIG. 1 is a schematic cross-sectional view partially broken away, of a prior art injection molding method utilizing a pin to prevent plastic flow into a fixed volume spill cavity.
Figure 2:
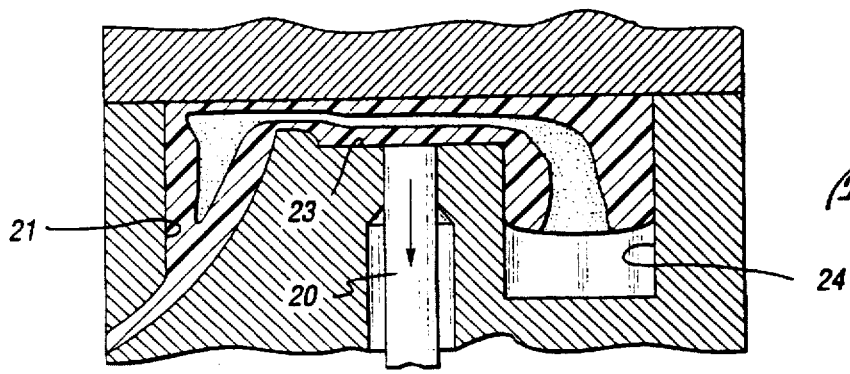
FIG. 2 is a view similar to FIG. 1 with a pin in its down position and illustrating blow out in the spill cavity due to the lack of sufficient amount of plastic in the article defining cavity.
Figure 3:
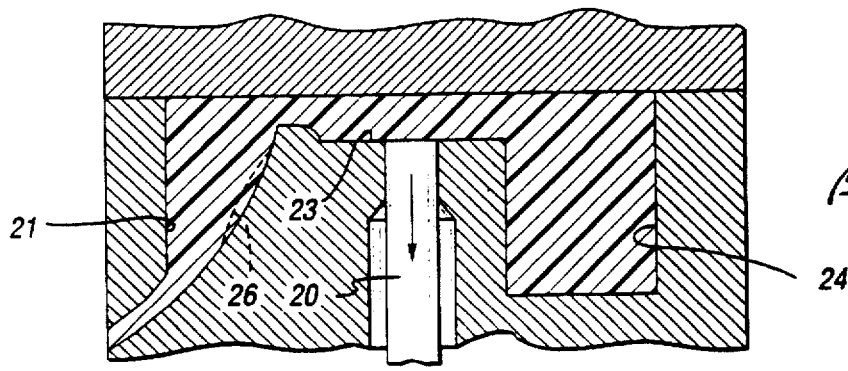
FIG. 3 is a view similar to FIG. 2 except too much plastic has been utilized with resulting sink marks.
Figure 4:
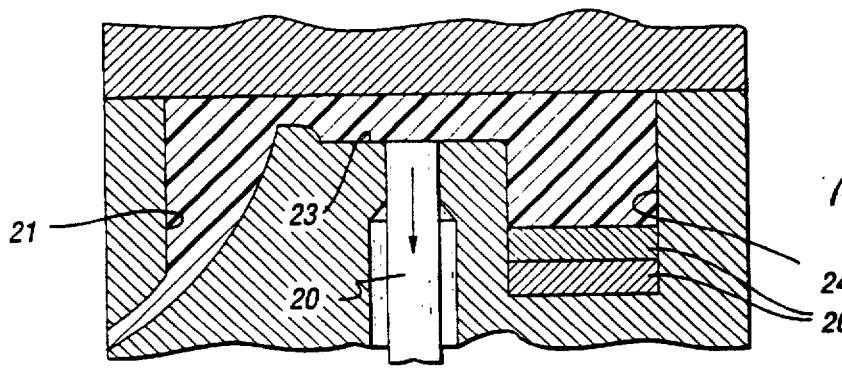
FIG. 4 is a view similar to the views of FIGS. 2 and 3 with the addition of shims located at the bottom of the spill cavity.
Figure 5:
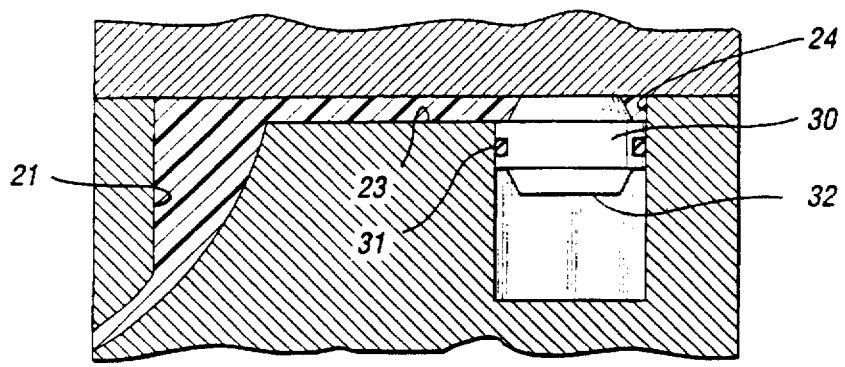
FIG. 5 is a view similar to FIGS. 1–4 illustrating the method and system of the present invention but without the use of a pin but rather including a pneumatically controlled piston.
Figure 6:
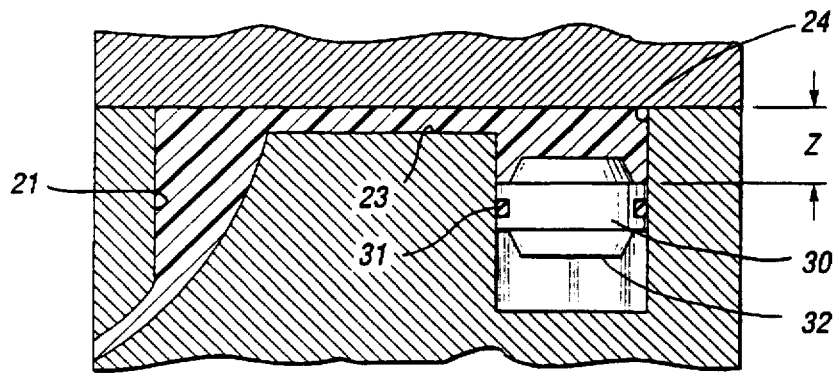
FIG. 6 is a view similar to FIG. 5 after the step of plastic injection.
Figure 7:
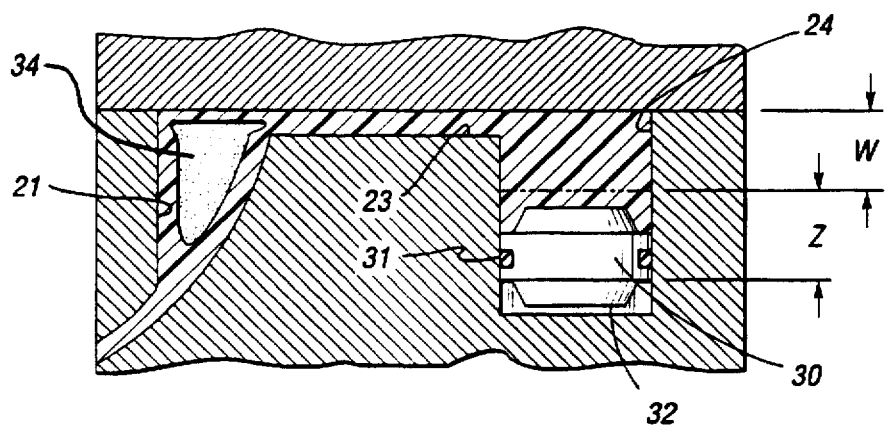
FIG. 7 is a view similar to FIG. 6 after the introduction of pressurized gas into the mold cavity to form the hollow part.

In step 110, a quantity of molten plastic is injected from an injection molding machine into the article defining mold cavity 21 (i.e., FIGS. 5–7). The plastic may be most thermoplastics and works particularly well with glass or mineral filled thermoplastic polyester, commonly known by the trademark Valox of General Electric Co. The quantity is sufficient to fill the mold cavity and partially fill the spill cavity 24 as illustrated in FIG. 5. Prior to plastic injection, the piston 30 is in its uppermost position as illustrated in FIG. 5 due to gas pressure on its lower surface 32.

FIG. 6 shows how the piston 30 moves down to take up any excess plastic (i.e., "Z") during plastic injection.

In step 112 (i.e., FIG. 7), a charge of pressurized gas is introduced into the mold upon substantial completion of the injection of the quantity of molten plastic.

In step 114, the gas flow into the mold is maintained in pressure and duration in amount and time sufficient to displace a controlled quantity of plastic from the article defining mold cavity into the spill cavity 24 which is flow coupled to the mold cavity 21 by the runner 23. This causes an additional amount of plastic "W" to flow into the spill cavity 24. The gas tends to displace the hottest, most fluent plastic in the central portion of the mold cavity. Consequently, the molded plastic article has a hollow interior where the least viscous plastic has been displaced. The presence of the gas affords savings in weight and material usage. Added benefits include enhanced surface quality due to the outward pressure exerted by the gas, and reduced cycle time due to displacement of the relatively hot plastic from the central portion of the article.

In step 116, the article is permitted to solidify within the mold cavity 21 while the internal gas pressure is maintained.

In step 118, the pressurized gas is vented from the interior of the molded article preparatory to opening the mold. Numerous ways of venting are possible such as described in the U.S. Pat. No. to Friederich 4,101,617.

In step 120, the plastic article is removed from the mold.

In step 122, the purged or displaced plastic is removed from the spill cavity 24 or reservoir. The piston 30 is pushed upward in the spill cavity 24 by pressurized gas. If the piston 30 has a stop secured thereto, the stop prevents the piston 30 from exiting the mold. In certain cases, steps 120 and 122 can be the common operation of ejecting the moldings so formed from the article defining cavity 21 and the spill cavity 24.

Figure 9:
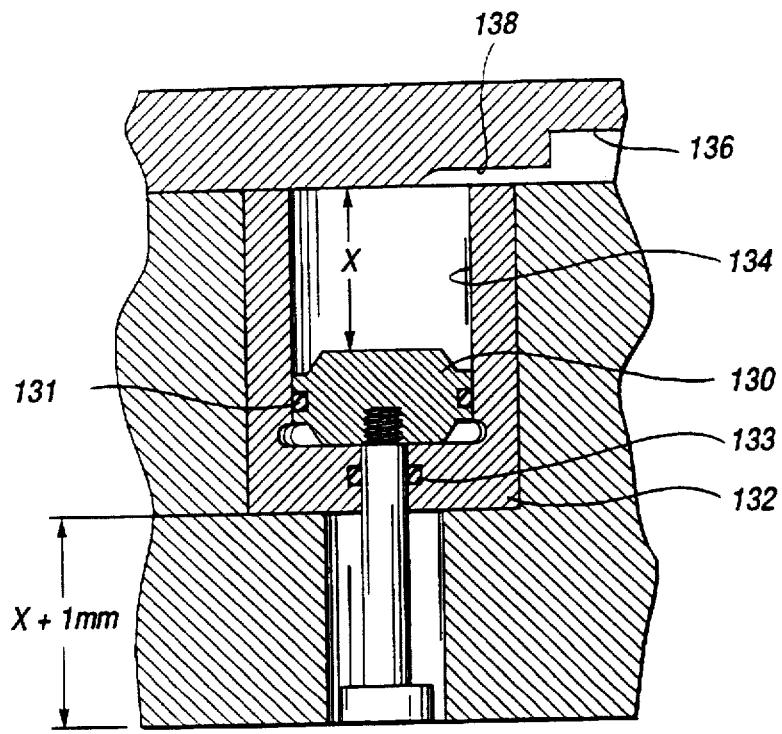
FIG. 9 is a schematic cross-sectional view, partially broken away, wherein the piston of FIGS. 5–7 is connected to a stop.
Figure 10:
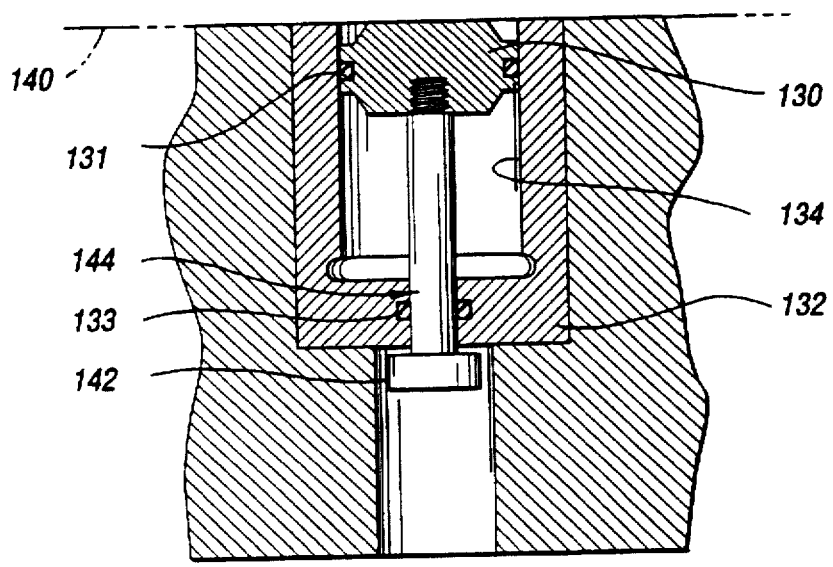
FIG. 10 is a view similar to FIG. 9 with the piston in its up position.

Referring now to FIGS. 9 and 10, there is illustrated a second embodiment of a piston 130 reciprocally mounted within a cylinder 132 which together define a variable volume spill cavity 134 flow coupled with an article defining cavity 136 via a runner 138. The piston 130 is shown in FIG. 9 in its down position in which the spill cavity 134 may be filled along its X dimension with plastic waiting to be ejected.

FIG. 10 illustrates the piston 130 in its up position wherein a mold parting line 140 of the mold is shown and wherein approximately 1 millimeter (exaggerated) is shown as a space between a stop 142 of a stop pin, generally indicated at 144, which is threadedly secured at its opposite end to the piston 130. Typically, the piston 130 is in its up position as illustrated in FIG. 10 during plastic entry into the mold.

The method and system of the present invention can be practiced with or without the use of a positive stop.

Figure 11:
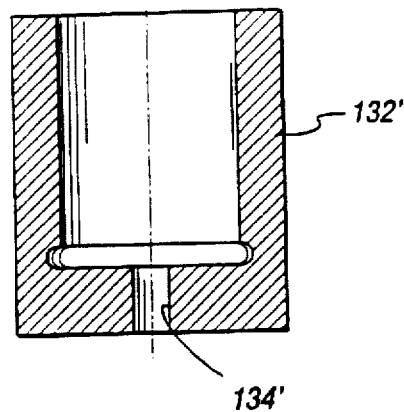
FIG. 11 is a cross-sectional view of a cylinder for use with a piston which together define a variable volume spill cavity.

Referring now to FIG. 11, there is illustrated one possible gas entry position into a cylinder 132' at 134' when no positive stop is utilized for the piston 130.

Figure 12:
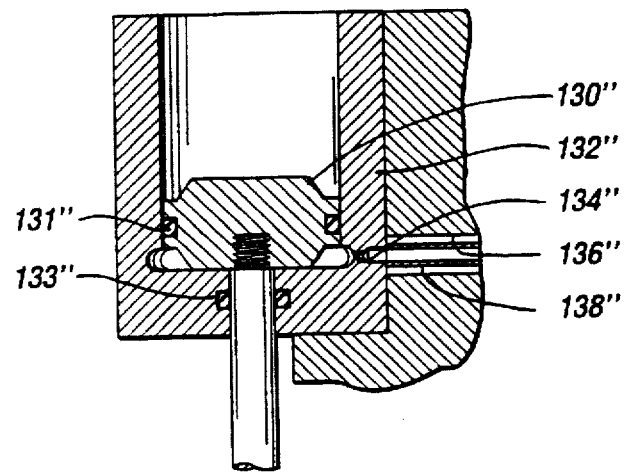
FIG. 12 is a view similar to FIG. 11 including a hole in the cylinder to supply pressurized gas to a lower surface of the piston.

As illustrated in FIG. 12, an alternative location for a gas entry hole through a cylinder 132" is at a position 134" formed in a curved wall of the cylinder 132". A hole 136" may be formed in the side of the mold for a gas pipe 138" for gas entry and gas exiting.

Figure 13:
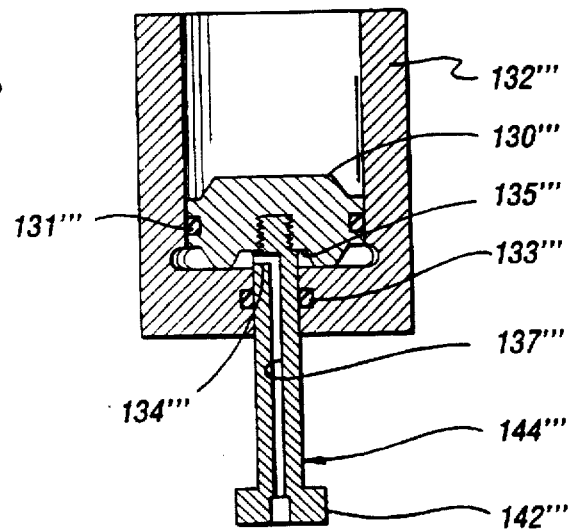
FIG. 13 is a view similar to FIG. 12 wherein a hole is formed through a stop pin to supply pressurized gas to the lower surface of the piston.

FIG. 13 illustrates another embodiment wherein a recess 135'" is formed at the lower surface of a piston 130'" to allow gas to act on the lower surface. Gas flows through a stop pin, generally indicated at 144'", along its longitudinal axis to a gas hole 137'" in fluid communication with a second transversely extending hole 134'" in fluid communication with the recess 135'". In the embodiment of FIG. 13, a flexible hose (not shown) is required to communicate gas to the stop pin 144'" at its stop 142'".

Referring now to FIG. 14, there is illustrated the offset cylinder hole 150 to allow room for a gas line to be machined on the thick edge portion of the wall of the cylinder 152. This embodiment may be used with or without a positive stop.

FIG. 15 is a side elevational view of the cylinder 152 in a mold 154 illustrating how fluidly communicating holes 150 and 156 may be plugged by plugs 158 and 160, respectively. A gas pipe 162, as is further illustrated in FIG. 16, is shown positioned in a cut 164 formed in the mold.

Referring now to FIG. 17, there is illustrated an example of a gas or pneumatic control circuit, generally indicated at 166, for use with the method and system of the present invention. The control circuit 166 includes a directional valve 168 coupled to a gas source 170. The directional valve 168 is also connected to a pressure reducing valve 172 which is fluidly coupled to the spill cavity 134 defined by the cylinder 132 through a check valve 174. The spill cavity 134 is also fluidly coupled to a vent valve 176 as well as to directional valve 178. The directional valve 178 is also coupled to a second pressure reducing valve 180.

Referring to FIGS. 9, 10 and 17, initially the directional valve 168 is energized after the mold closes and before plastic injection starts. Pressure from the pressure reducing valve 172 pushes the piston 130 within the cylinder 152 upward to its fully up position. Then the plastic is injected into the article defining cavity 136. When the plastic injection is stopped, valve 178 is energized and valve 168 is deenergized. This sets the pressure that the piston in the spill over 134 will be able to absorb or accept from the plastic being pushed from the thick section of the article defining cavity 136 through the gate 138 into the spill cavity 134.

When gas pressure is injected into the molding in the article defining cavity 136, it is greater than the gas pressure on the lower surface of the piston 130. Therefore, the piston 130 will move downward until the pressure on both faces of the piston 130 equalize. Then, the gas pressure on the lower surface of the piston 130 is maintained.

When the pressure of the gas injected into the molding equalizes with the gas pressure on the lower surface of the piston 130, no more plastic can go into the spill cavity 134.

After the part has set-up in the article defining cavity 136, the gas is vented by any well known method such as sprue break or by deenergizing valve 178 and energizing the vent valve 176 to vent the gas from the lower surface of the piston 130.

As the mold is opened, valves 168 and 180 are deenergized and energized, respectively, with valve 180 being set lower in pressure than valve 172. The valve 180 controls the piston 130 so that it will start to move upward, thereby ejecting the solidified overflow plastic from the spill cavity 134. When the piston 130 reaches the top of the spill cavity 134, valves 168 and 178 are deenergized. At this point, the system is ready for the next cycle.

Preferably, the pistons 30, 130, 130" and 130'" include gas seals 31 (FIGS. 5–7), 131 (FIGS. 9–10), 131" (FIG. 12) and 131'" (FIG. 13), respectively. Also, preferably, gas seals 133 (FIGS. 9–10), 133' (FIG. 12) and 133" (FIG. 13) are disposed in their respective cylinders 132, 132" and 132'" about their respective pin stops 144, 144" and 144'".

As the injection unit varies in shot size, the length of movement of the pistons 30, 130, 130" and 130'" varies to compensate for the shot size variance.

Also, pressure equalization between the pressure of the gas in the molding within the article defining cavity 21 and the pressure of the gas on the lower surface 32 of the piston 30 is one of the important features of the present invention.

When the pressures are equal, there is no movement of the piston 30 in the spill cavity 24. Also, the system may be a closed system in which no gas is added and no gas is vented.

The cylinder 132 may comprise a hardened steel bushing inserted into the mold and may particularly comprise a standard D.M.E. shoulder pin bushing which is hardened and precision ground. Multiple bushings or steel tube spacers may be used with O-rings sealingly positioned therebetween if a larger cylinder is required in order to obtain additional volume to receive the plastic from the article defining cavity 136.

Preferably, the piston 130 comprises a fine grain gas piston and which may include a gas safety outlet which extends from the lower surface of the piston 130 to a side wall surface of the piston 130 to prevent the piston 130 from exiting the mold if a stop pin such as the stop pin 144 is not provided.

Many different methods may be utilized to introduce a charge of pressurized gas into the article defining cavity 21. For example, a gas pin may be located adjacent the thick section of the mold as illustrated in FIGS. 5–7 to insert gas therein.

Oil pressure may be utilized instead of gas pressure in order to exert fluid pressure on the lower surface 22 of the piston 30. However, it is preferred to have nitrogen gas as the pressure on the lower surface 32 of the piston 30 since such controllable source of gas is already utilized to form voids 34 within the molding in the article defining cavity 21.

Also, movement of the piston 30 and ejecting the solidified plastic from within the spill cavity 24 may rupture the runner system 23 and cause gas in the molding to escape if one does not wish to vent the gas in the molding through a gas pin located adjacent the article defining cavity 21.

Figure 18:
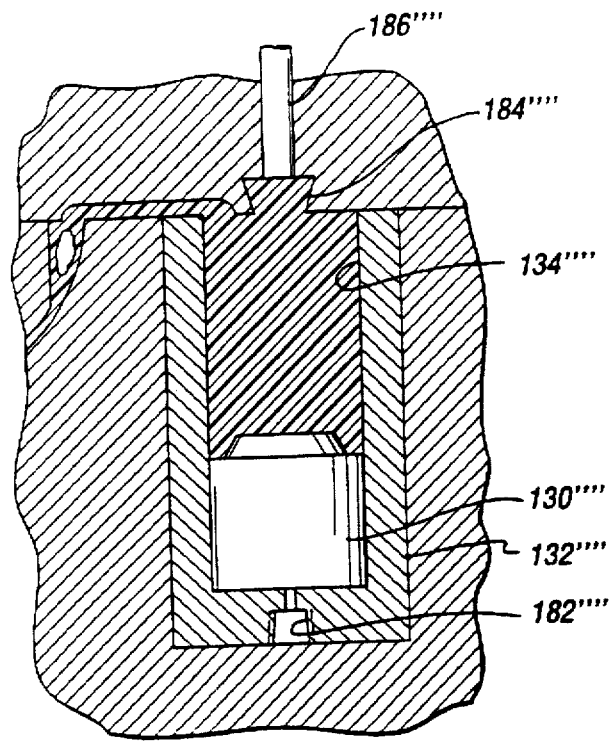
FIG. 18 is a schematic cross-sectional view, partially broken away, wherein an ejector pin is illustrated to eject solidified plastic after it is pulled out of the spill cavity.

Referring now to FIG. 18, there is illustrated a piston 130"" in a cylinder 132"" having an aperture 182"" for allowing pressurized gas at a lower surface of the piston 130"". The variable volume of a spill cavity 134"" is shown filled with solidified plastic.

A spill over puller 184"" mounted at one end of an ejector pin 186"" pulls the solidified plastic out of the spill cavity 134"" and the ejector pin 186"" ejects the plastic after it is pulled out of the spill cavity 134"".

Figure 19:
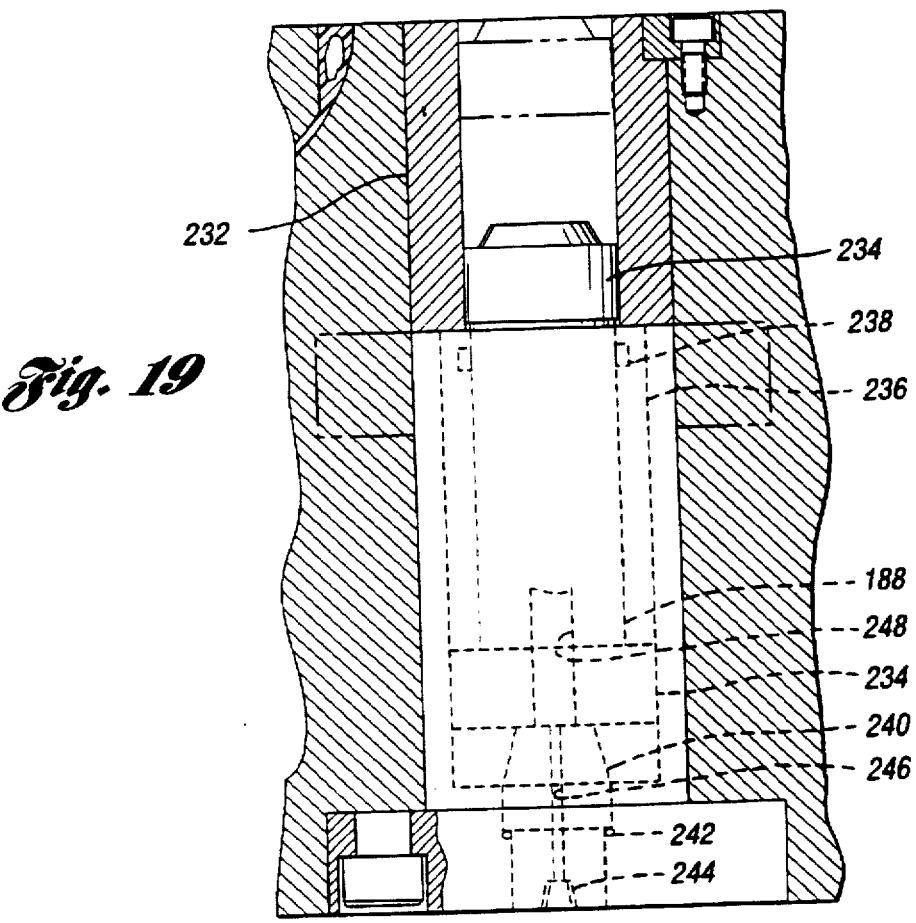
FIG. 19 is a schematic cross-sectional view, partially broken away, wherein an air spring is utilized in the system of the present invention.

Referring now to FIG. 19, there is illustrated a conventional air spring 188 which may be utilized with a piston 234 instead of the pneumatic control circuit 166. The piston 234 is mounted in a hardened bushing such as a guide post bushing 232. The bushing 232 is mounted on a second bushing 236 which is sealed by a rod gas seal 238. A piston down stop 240 prevents downward movement of the piston 234. A gas seal 242 seals the down stop 240. A connector 244 allows gas to flow through an aperture 246 to a hole 248 in the piston 234.

The following steps are utilized in practicing the method and system of FIG. 19:

1. Piston 234 is up when mold closes.

2. Pressure on piston 234 is equal to the plastic injection pressure.

3. During injection of plastic, the plastic in excess of what is required to fill the molding will go into the spill over defined by the bushing 232 only at the pressure of injection. This eliminates (a) overpacking of molding and (b) inaccuracy of injection unit to deliver same quantity of plastic on each shot. The gas pressure set on the air spring 188 will stay constant and not increase as plastic enters, as it is coupled to a gas relief valve not shown) set at the injection pressure.

4. When gas is injected into the molding, the pressure on the piston 234 is reduced automatically to, for example, one-half of gas injection pressure.

5. As the pressure now on the piston 234 is locked in, as the plastic is pushed into the over flow area, the pressure on the piston 234 will increase in direct proportion to its downward movement.

6. When the pressure from gas injection equalizes with the trapped pressure on the piston 234, no more movement of plastic into the spill over will occur. If not enough plastic goes into spill over, either reduce pressure on the piston 234 or increase pressure of gas injection. If too much plastic goes into the spill over, just reverse the above (i.e., put more pressure on the piston 234 or decrease gas inlet pressure).

7. Open mold and eject spill over material in the bushing 232 out by putting pressure on the piston 234. The piston 234 will not leave the bushing 232 as the air spring 188 will have reached its maximum stroke when the topmost surface of the piston 234 is flush with the parting line of the mold. This design also eliminates the need for a shut-off pin between the article defining cavity and the spill over. This design further eliminates overpacking of the mold cavity and takes care of the inaccuracies of the screw to deliver precise shot weights on each cycle.

While the best mode for carrying out the invention has been described in detail, those familiar with the art to which this invention relates will recognize various alternative designs and embodiments for practicing the invention as defined by the following claims.

What is claimed is:

1. A system for injection molding a hollow article, the system comprising:

means for injecting a quantity of fluid plastic into a mold cavity having a shape defining at least a portion of the article;

means for introducing a charge of pressurized gas into the mold cavity to displace a portion of the plastic from the mold cavity into a spill cavity having a volume flow coupled to the mold cavity; and means for venting the gas from the mold cavity, the improvement comprising:

means for allowing the volume of the spill cavity to increase in a controlled fashion to a final volume based on the amount of plastic injected into the mold cavity, the volume of the spill cavity increasing during the displacement of the portion of the plastic from the mold cavity into the spill cavity to produce a substantially strain-free plastic part.

2. The system as claimed in claim 1 wherein the means for allowing includes a cylinder and a piston reciprocally mounted within the cylinder which together define the spill cavity and wherein the system further comprises means for controlling pressure exerted on the piston to control movement of the piston within the cylinder.

3. The system as claimed in claim 2 wherein the means for controlling includes an air spring for controlling pressure on the piston.

4. The system as claimed in claim 2 wherein the means for controlling includes a pneumatic control circuit for controlling pneumatic pressure on the lower surface of the piston.

5. The system as claimed in claim 4 further comprising a stop associated with one of the piston and the cylinder to prevent movement of the piston out of the cylinder.

6. The system as claimed in claim 5 wherein the stop includes a stop pin connected to the piston to move therewith.

7. The system as claimed in claim 6 wherein the stop pin includes a hole formed therein to fluidly communicate the lower surface of the piston with the pneumatic control circuit.

8. The system as claimed in claim 4 wherein the cylinder includes an aperture therein to fluidly communicate the lower surface of the piston with the pneumatic control circuit.

9. The system as claimed in claim 1 further comprising means for ejecting the portion of the plastic from the spill cavity.

10. The system as claimed in claim 9 wherein the means for ejecting includes an ejector pin.

* * * * *